United States Patent
Brown et al.

(10) Patent No.: US 6,315,072 B1
(45) Date of Patent: Nov. 13, 2001

(54) MOTORCYCLE ENGINE MOUNTING ASSEMBLY

(75) Inventors: William H. Brown, Menomonee Falls; John W. Schanz, Mequon; James A. Wollmer, Menomonee Falls, all of WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 0 days.

(21) Appl. No.: 09/363,404

(22) Filed: Jul. 29, 1999

(51) Int. Cl.[7] .................................................. B62M 7/02
(52) U.S. Cl. ........................ 180/228; 180/219; 180/230
(58) Field of Search ................................. 180/219, 228, 180/230, 374, 377

(56) References Cited

U.S. PATENT DOCUMENTS

| | | | |
|---|---|---|---|
| 3,811,528 | * | 5/1974 | Hooper .................................. 180/230 |
| 4,396,084 | * | 8/1983 | Yoshimura et al. .................. 180/219 |
| 4,412,597 | * | 11/1983 | Aiba ....................................... 180/228 |
| 4,465,157 | * | 8/1984 | Onishi et al. ........................ 180/228 |
| 4,550,698 | * | 11/1985 | Konneker ............................. 180/228 |
| 5,248,012 | * | 9/1993 | Kurawaki et al. ................... 180/219 |
| 5,390,758 | * | 2/1995 | Hunter et al. ........................ 180/228 |
| 5,469,930 | * | 11/1995 | Wiers ..................................... 180/227 |
| 5,857,538 | * | 1/1999 | Chambers ............................. 180/219 |
| 5,876,013 | * | 3/1999 | Ott .......................................... 180/228 |
| 6,085,855 | * | 7/2000 | Schanz et al. ........................ 180/219 |

FOREIGN PATENT DOCUMENTS

| | | | |
|---|---|---|---|
| 866584 | * | 3/1971 | (CA) ..................................... 180/228 |
| 662587 | * | 8/1929 | (FR) ..................................... 180/228 |

OTHER PUBLICATIONS

Yamaha Star 1998 Catalog—2 facing pages (not numbered).
1993 and 1994 XLH Models Service Manual—p. 3–9.

* cited by examiner

*Primary Examiner*—Anne Marie Boehler
(74) *Attorney, Agent, or Firm*—Michael Best & Fiedrich LLP

(57) ABSTRACT

A motorcycle includes a frame having an upper member, a pair of front members, a pair of lower members, and a pair of rear members. An engine is mounted to the frame with a pair of bolts, one of which is disposed adjacent the front members of the frame, and the other of which is disposed adjacent the lower members of the frame. The rear portion of the engine is mounted to the motorcycle transmission assembly along a vertical interface. The transmission assembly is mounted to a cross member joining the lower members of the frame, to the upper member of the frame with an upper support, and to the rear members of the frame with a swing arm bolt.

5 Claims, 7 Drawing Sheets

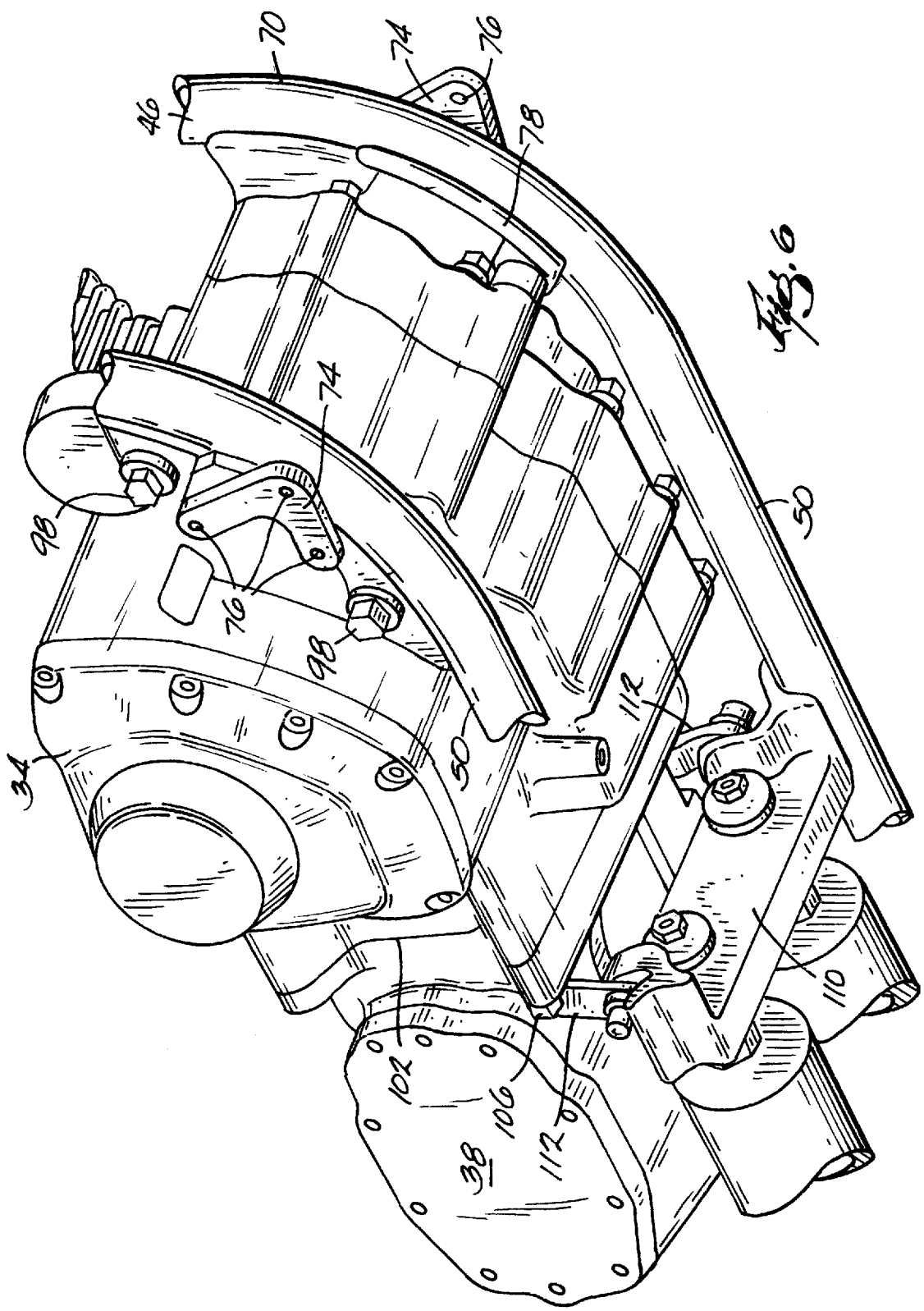

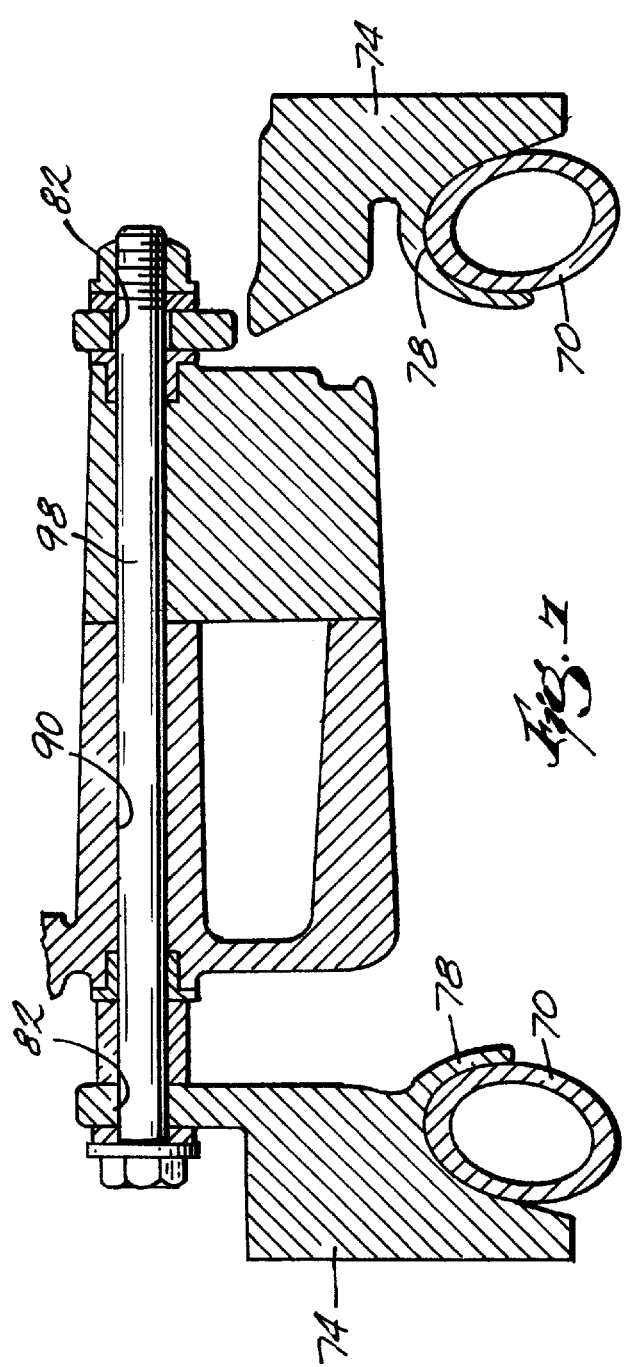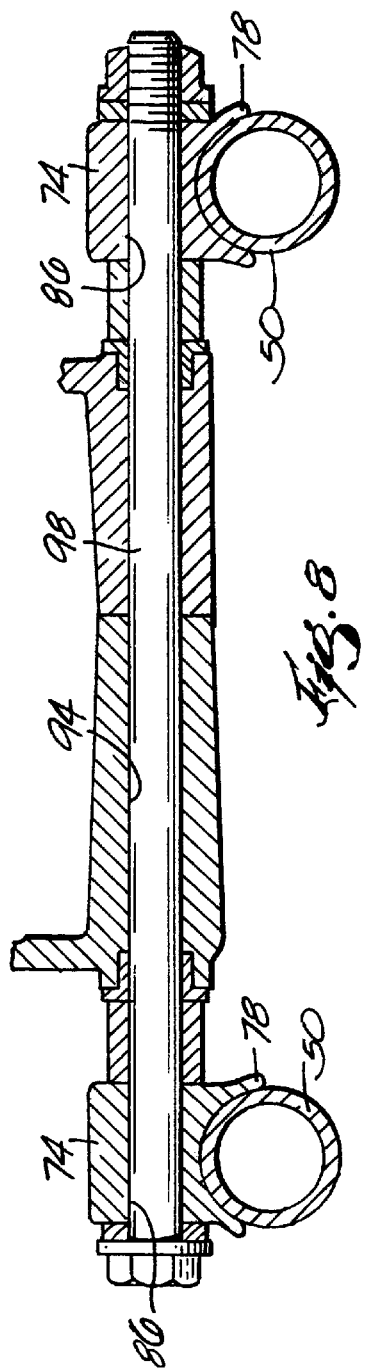

MOTORCYCLE ENGINE MOUNTING ASSEMBLY

FIELD OF THE INVENTION

The invention relates to a mounting assembly for a motorcycle internal combustion engine.

BACKGROUND

Prior art motorcycles typically include an engine mounted within a frame. One such frame includes an upper portion running generally horizontally, a front portion extending downwardly from the upper portion at the front of the motorcycle, a lower portion extending rearwardly from the bottom of the front portion, and a swing arm mounting portion at the rear of the frame. The front, lower, and swing arm mounting portions of the frame typically include spaced-apart, generally parallel tubular members.

In such prior art motorcycles, the engine is commonly mounted to the frame with fasteners at the front of the engine, the bottom of the engine, and the top of the engine. The bottom of the engine is typically mounted to a cross member joining the tubular members of the lower portion of the frame, and the cross member is usually machined to provide a level surface for the engine. The top of the engine is usually mounted to the upper portion of the frame with a bolt. A first fastener is typically used to mount one side of the front portion of the engine to one of the tubular members of the front portion, and a second fastener is used to mount the other side of the front portion of the engine to the other front portion member of the frame.

Some prior art engines are mounted to the transmission assembly along a horizontal interface with generally vertical fasteners. Alternatively, the engine and transmission are independently mounted to the frame and are then aligned with each other without directly attaching the engine to the transmission. In such motorcycles, a drive chain or belt housing interconnects the engine and transmission assembly.

One well-known classic motorcycle includes a seat post extending from the seat down between the engine and transmission to a cross member joining the tubular members of the lower portion of the frame. Many motorcycle riders and enthusiasts agree that it is desirable to maintain this classic look.

SUMMARY

It has been found that prior art engines can be difficult to mount to the motorcycle frame. Because of the many bolts and other fasteners used to mount the engine to the frame, alignment of the several mounting points with corresponding mounting points on the frame is critical in prior art motorcycles. Also, the cross member to which the bottom of the engine is mounted in the prior art must be machined to level the engine and transmission.

One reason for the multiple mounting points required by the prior art is the nature of the transmission-to-engine interface. As mentioned above, it is common to have no direct attachment between the engine and transmission assembly, and the drive chain or belt housing does not provide significant rigidity. For those motorcycles having a horizontal interface between the engine and the transmission assembly, there is also a lack of resistance to the engine and transmission assembly pivoting with respect to each other about a horizontal, transverse axis. Thus, several mounting points are commonly used to stiffen some prior art transmission and engine assemblies.

The present invention provides a motorcycle having a transmission assembly mounted to the motorcycle frame, an engine having a rear portion mounted only to the transmission assembly, a top portion mounted to an upper frame member, and a front portion mounted to the frame with exactly two fasteners that are non-coaxial. The rear portion of the engine and transmission assembly are joined along a vertical interface with generally horizontally-oriented fasteners. This vertical interface provides a very stiff engine and transmission assembly. Preferably, the frame includes a generally vertical forward member to which the engine is mounted with one of the non-coaxial fasteners, and a lower member to which the engine is mounted with the other non-coaxial fastener. The transmission assembly is mounted in two locations on opposite sides of the transmission assembly to a cross member of the frame, and an upper support interconnects the upper frame member to the transmission assembly.

Other features and advantages of the invention will become apparent to those skilled in the art upon review of the following detailed description, claims, and drawings.

BRIEF DESCRIPTION OF THE DRAWINGS

FIG. 6 is a perspective view of the bottom of the engine, transmission assembly, and frame.

FIG. 7 is a cross section view taken along line 7—7 in FIG. 5.

FIG. 8 is a cross section view taken along line 8—8 in FIG. 5.

Figure 1:
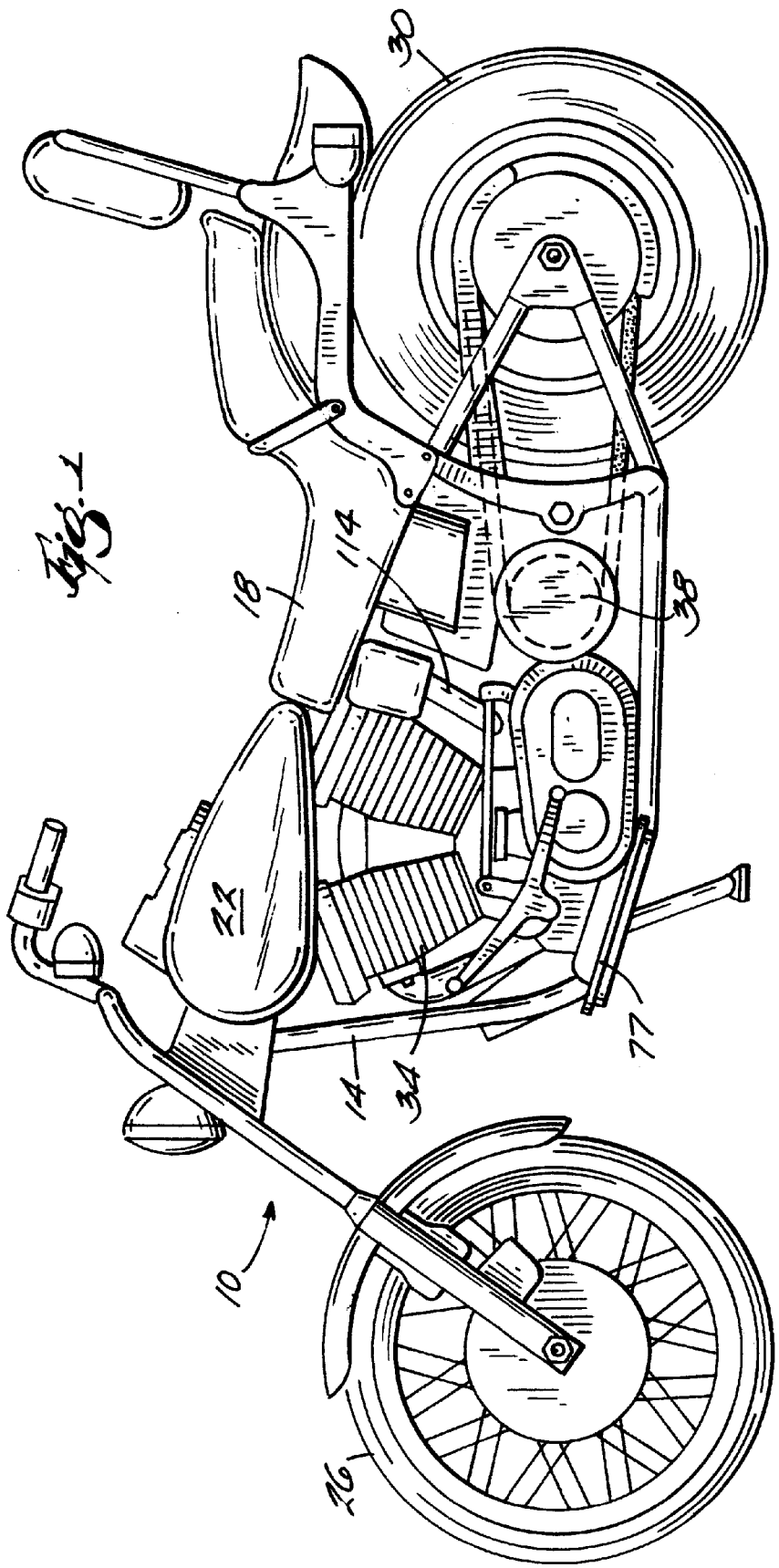
FIG. 1 is a left side elevational view of a motorcycle embodying the present invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify steps of a method or process is simply for identification and is not meant to indicate that the steps should be performed in a particular order.

DETAILED DESCRIPTION

Figure 2:
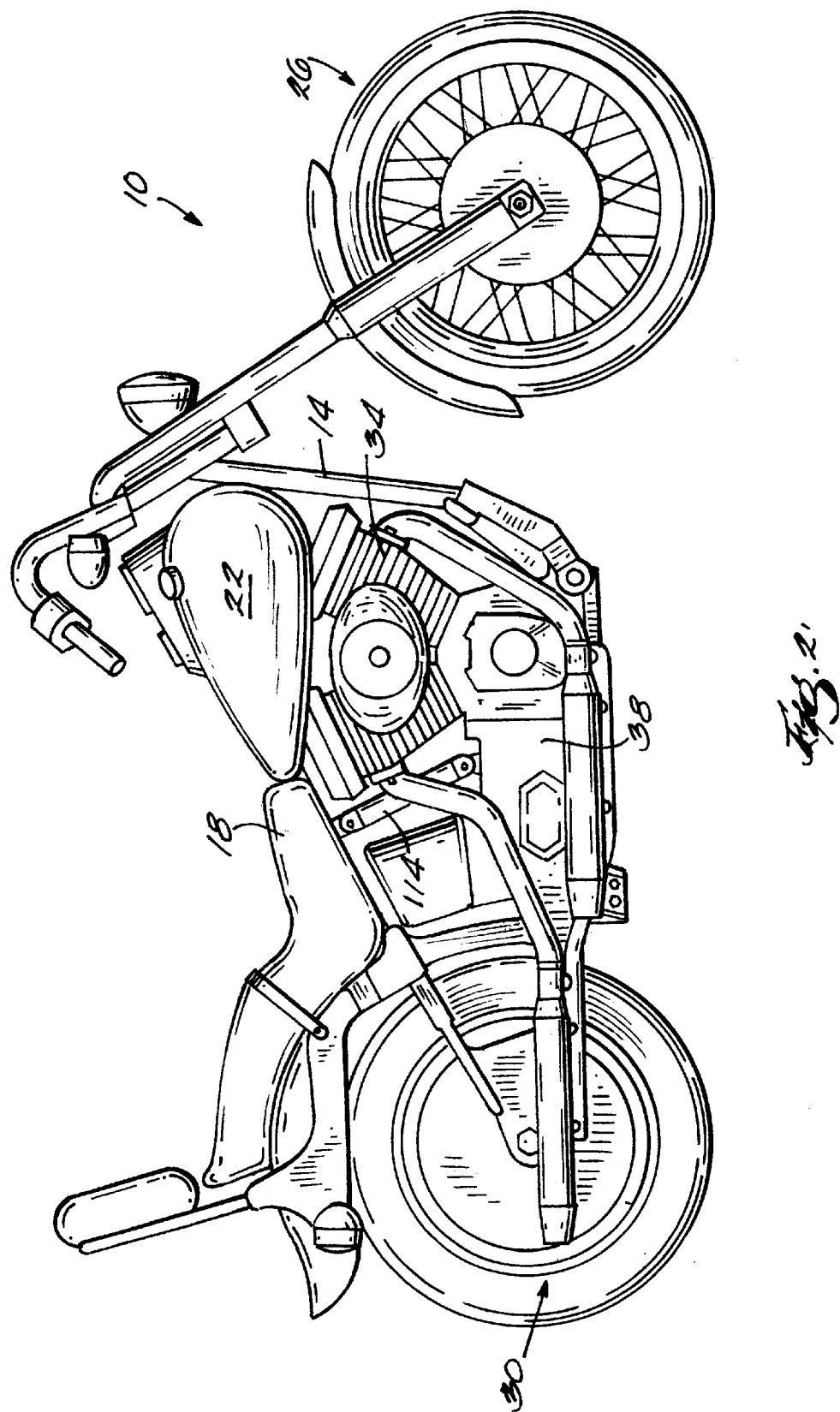
FIG. 2 is a right side elevational view of the motorcycle.

FIGS. 1 and 2 illustrate a motorcycle 10 including a frame 14. Mounted to the frame 14 are a seat 18, a fuel tank 22, front and rear wheel assemblies 26, 30, an engine 34, and a transmission assembly 38. The illustrated engine 34 is V-twin two-cylinder four-stroke engine including first and second cylinders. The invention may, however, be embodied in motorcycle having a single-cylinder engine, a multi-cylinder, in-line engine, or any other suitable engine.

Figure 3:
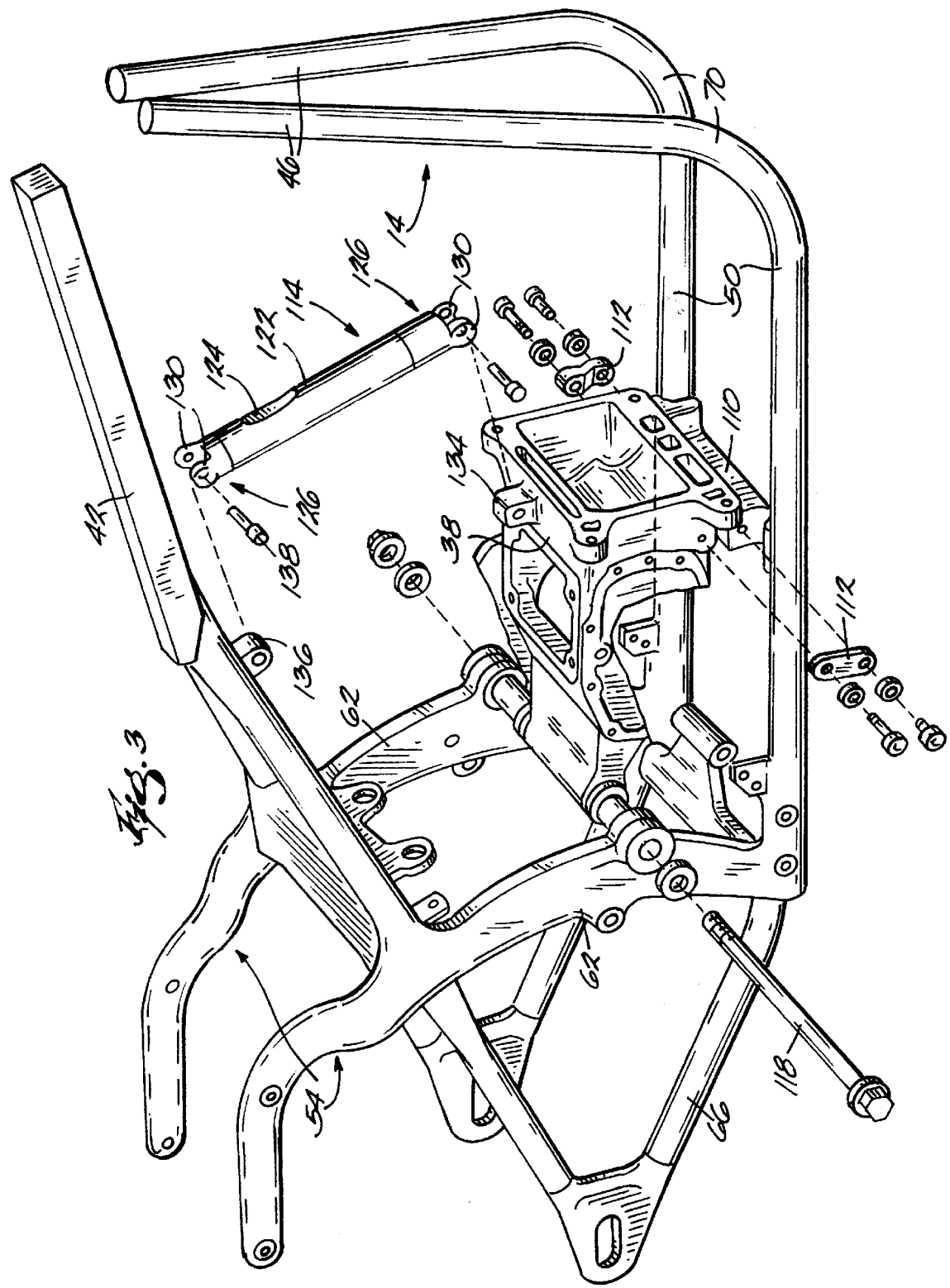
FIG. 3 is a perspective partially-exploded view of the frame of the motorcycle with most components removed or partially broken away for the purpose of illustration.

FIG. 3 better illustrates the motorcycle frame 14. The frame 14 includes a backbone or upper member 42, a pair of front members 46, a pair of lower members 50 that are substantially parallel to each other, and a pair of rear members 54 that include a pair of pivot mounting portions 62 to which the motorcycle's swing arm 66 is pivotally mounted. A curved transition portion 70 joins the front members 46 to the lower members 50.

Figure 4:
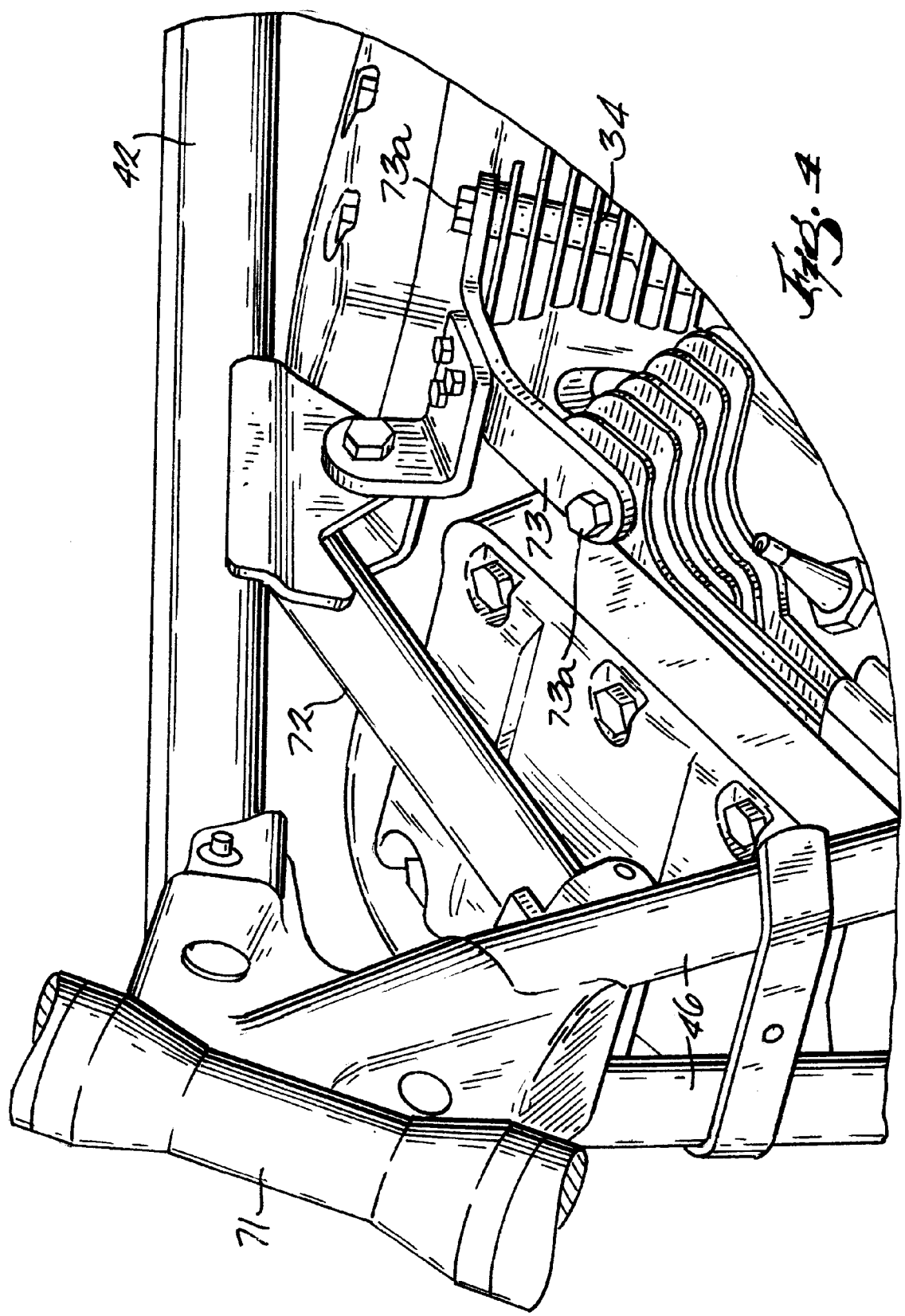
FIG. 4 is an enlarged partial view of a portion of the frame and the top portion of the engine.

FIG. 4 illustrates the top portion of the engine 34 and the means for interconnecting the top portion of the engine 34 to the upper member 42 of the frame 14. The upper member 42 of the frame 14 is interconnected with the front members 46 by a housing 71 that contains bearings for the motorcycle's steering assembly, and a truss member 72. The top portion of the engine 34 is mounted to the upper member 42 of the frame 14 by way of an upper mounting strap 73. The upper mounting strap 73 extends between the two cylinders, and is fastened to the cylinders with fasteners 73a.

Referring now to FIGS. 5–8, a mounting bracket 74 is welded or otherwise mounted to each curved transition portion 70. The brackets provide mounting points 76 (FIGS. 5 and 6) for a motorcycle footboard or footpeg assembly 77 (FIG. 1). The brackets 74 include curved portions 78 that mirror the curved surface of the frame tubes. The brackets 74 also curve to mirror the curved transition portions 70 of the frame 14. The brackets 74 therefore fit against and at least partially around the tubes of the curved transition portion 70.

Each bracket 74 includes an upper pair of mounting points in the form of apertures 82 (FIG. 7), and lower pair of mounting points in the form of apertures 86 (FIG. 8). The engine 34 includes upper and lower mounting bores 90, 94, respectively, that align with the upper and lower apertures 82, 86 of the brackets 74. The apertures 82, 96 of each bracket 74 are no more than about 7 inches, and preferably about 5 inches, from each other. The front portion of the engine 34 may therefore be mounted to the frame 14 with only two bolts 98 that are relatively closely spaced and that extend through both brackets 74. One of the bolts 98 is spaced from the front members 46 of the frame 14 and the other bolt 98 is spaced from the lower members 50 of the frame 14. The bolts 98 are thus non-coaxial, meaning that the longitudinal axes of the bolts 98 may be angled at substantially any angle with respect to each other, but are not collinear.

The engine 34 is mounted to the transmission assembly 38 along a vertical interface 102. Four generally horizontal bolts 106 secure the corners of engine 34 and transmission assembly 38 interfaces together. Because of the stiffness afforded by this vertical interface 102, the rear portion of the engine 34 may be supported only by this interconnection with the transmission assembly 38. Accordingly, the rear portion of the engine 34 is not directly mounted to the frame 14. Alternatively, the transmission and engine may be provided as a single unit.

Figure 5:
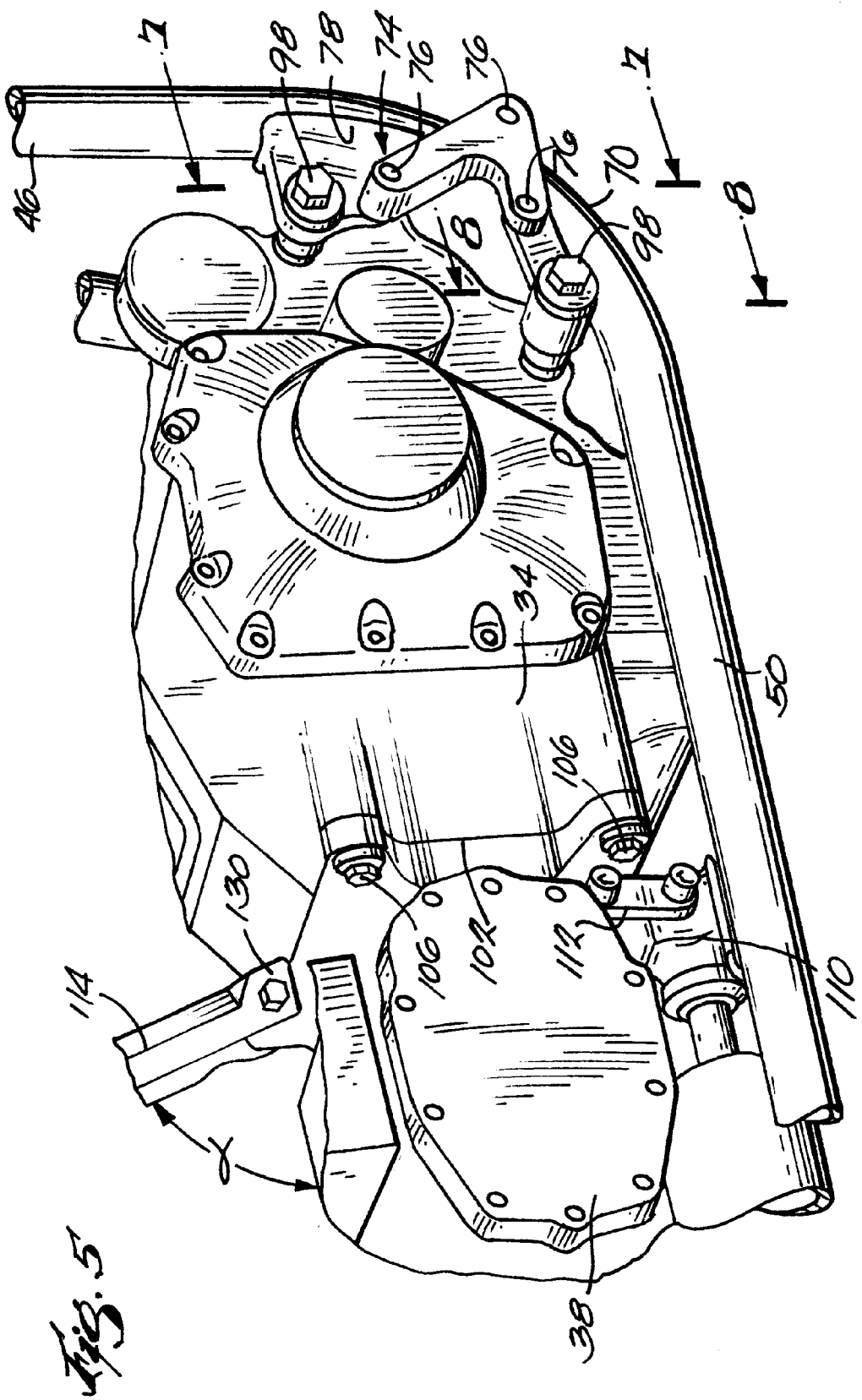
FIG. 5 is a perspective view of the right side of the engine, transmission assembly, and frame.

As seen in FIGS. 3, 5, and 6, the bottom of the transmission assembly 38 is mounted to a cross member 110 with lower mounting straps 112. The cross member 110 joins the two lower members 50. The mounting straps 112 are fastened to the cross member 110 on the left and right sides of the transmission assembly 38. The top of the transmission assembly 38 is joined to the upper member 42 with an upper support 114, and the rear of the transmission assembly 38 is mounted to the pivot mounting portion 62 of the frame 14 with a single bolt 118. The upper support 114 provides a structural tie between the upper member 42 of the frame 14 and the transmission assembly 38. The transmission assembly 38 is thus mounted to the frame 14 with the mounting straps 112, bolt 118 and upper support 114.

More specifically, and with reference to FIG. 3, the illustrated upper support 114 includes a central tube 122 having a recessed portion 124 to accommodate a portion of the rear cylinder of the engine 34. Cast end caps 126 are welded to the ends of the tube 122. The end caps 126 include forks having a pair of legs 130 including apertures. The legs 130 of the forks are positioned on either side of a mounting point 134 on the transmission assembly 38 and a mounting point 136 on the upper member 42 of the frame, and a pin or bolt 138 is passed through the apertures in the legs 130 and mounting points 134, 136. In this regard, the upper support 114 is pivotally mounted at either end. An alternative upper support 114 construction is shown in FIG. 5. This upper support 114 includes an elongated member having a U-shaped cross section. The forks and legs 130 are formed integrally with the upper support 114, and therefore no end caps 126 are used in this construction.

Alternatively, the mounting points 134, 136 could include a forked portion into which a portion of the upper support 114 is inserted and pinned or bolted. Alternatively, neither the frame 14, transmission assembly 38, nor the upper support 114 may include a forked portion, in which case, substantially flat portions at either end of the upper support 114 may be simply pinned or bolted to the transmission assembly 38 and upper member 42 at the mounting points 134, 136.

The upper support 114 gives the impression of a classic seat post that is attached to the undersurface of the seat 18 and the lower member 50 of the frame 14 or the cross member 110. Preferably, the upper support 114 is disposed at an angle $\alpha$ (FIG. 5) with respect to vertical that is between about 65°–75°.

What is claimed is:

1. A motorcycle comprising:
    a frame including an upper member, a lower member, and a front member joining said upper and lower members;
    a transmission assembly having an upper front portion, said transmission assembly being mounted to said frame below said upper member;
    an upper support interconnecting said upper front portion of said transmission assembly to said upper member;
    an engine disposed below said upper member, said engine having a rear portion secured only to said transmission assembly and a front portion;
    first and second fasteners mounting said front portion to said frame, wherein said front portion is secured to said frame with only said first and second fasteners, and wherein said first fastener mounts said front portion to said front member and said second fastener mounts said front portion to said lower member.

2. The motorcycle of claim 1, wherein said lower member is a first lower member and said front member is a first front member, said frame including a second lower member and a second front member, said first fastener mounting said front portion to said first and second front members, and said second fastener mounting said front portion to said first and second lower members.

3. A motorcycle comprising:
    a frame including an upper member, a pair of lower members, and a cross member joining said lower members;
    a transmission assembly having an upper front portion, said transmission assembly being mounted to said frame below said upper member and to said cross member;

an upper support interconnecting said upper front portion of said transmission assembly to said upper member;

an engine disposed below said upper member, said engine having a rear portion secured only to said transmission assembly and a front portion;

first and second fasteners mounting said front portion to said frame, wherein said front portion is secured to said frame with only said first and second fasteners.

4. A motorcycle comprising:

a frame having an upper member, a pair of front members extending downwardly from said upper members, a pair of lower members extending rearwardly from said front members, a pair of curved transition portions connecting said front and lower members, and a pair of pivot mounting members extending upwardly from said lower members;

first and second brackets, each mounted to one of said curved transition portions, and each providing a first mounting point adjacent one of said front members of said frame, and a second mounting point adjacent one of said lower members of said frame, said first and second mounting points of each bracket being spaced from each other by not more than about 7 inches;

an engine having a front portion and a rear portion a first fastener extending through said first mounting point of each bracket and through a portion of said engine;

a second fastener extending through said second mounting point of each bracket, and through a portion of said engine;

a transmission assembly joined with said rear portion of said engine along a vertical interface, and secured thereto with a plurality of substantially horizontally-oriented fasteners, said transmission assembly having a pivot mounting portion;

a cross-member joining said lower members of said frame together;

a fastener joining said transmission assembly to said cross-member;

a fastener joining said pivot mounting portion of said transmission assembly to said pivot mounting members of said frame;

an upper support mounted to said upper member of said frame and to said transmission assembly; and an upper mounting strap interconnecting said engine with said upper member of said frame.

5. A motorcycle comprising:

a frame including an upper member;

an engine connected to said frame, said engine including a rear cylinder, a transmission assembly having an upper front portion, said transmission assembly being mounted to said frame below said upper member; and an upper support interconnecting said upper front portion of said transmission assembly to said upper member, wherein said upper support includes a recessed portion to accommodate a portion of said rear cylinder of said engine.

* * * * *